United States Patent [19]

Zur Muhlen et al.

[11] Patent Number: 4,852,042

[45] Date of Patent: Jul. 25, 1989

[54] ELECTRONIC JOURNAL WINDOW DISPLAY

[75] Inventors: Art D. Zur Muhlen; Albert A. Brescia, both of New Concord, Ohio

[73] Assignee: NCR Corporation, Dayton, Ohio

[21] Appl. No.: 19,821

[22] Filed: Feb. 27, 1987

[51] Int. Cl.⁴ .......................................... G06F 15/00
[52] U.S. Cl. ................... 364/900; 364/918; 364/965.4; 364/927.62; 364/401; 364/300
[58] Field of Search ............... 364/200, 900, 400, 401, 364/403, 404, 406, 407, 408, 405, 200 MS File, 900 MS File

[56] References Cited

U.S. PATENT DOCUMENTS

| | | | |
|---|---|---|---|
| 3,946,220 | 3/1976 | Brobeck et al. | 364/200 |
| 4,312,037 | 1/1982 | Yamakita | 364/405 |
| 4,408,292 | 10/1983 | Nakatani et al. | 364/405 |
| 4,412,294 | 10/1983 | Watts et al. | 364/900 |
| 4,441,160 | 4/1984 | Azcua et al. | 364/900 |
| 4,493,037 | 1/1985 | Takano et al. | 364/405 |
| 4,503,503 | 3/1985 | Suzuki | 364/405 |
| 4,508,962 | 4/1985 | Yamasaki | 235/378 |
| 4,642,794 | 2/1987 | Lavelle et al. | 364/900 |
| 4,654,822 | 3/1987 | Nakanishi et al. | 364/900 |
| 4,774,664 | 9/1988 | Campbell et al. | 364/408 |

FOREIGN PATENT DOCUMENTS 0182244 5/1986 European Pat. Off. .
58-54475 3/1983 Japan .
2048530 12/1980 United Kingdom .

OTHER PUBLICATIONS

Hewlett-Packard Journal, vol. 30, No. 6, May 1979 (Palo Alto, US), E. P. L. Ha et al.: "The Integrated Display System and Terminal Access Method", pp. 6–9.

Primary Examiner—Eddie P. Chan
Assistant Examiner—Adolfo Ruiz
Attorney, Agent, or Firm—Wilbert Hawk, Jr.; Albert L. Sessler, Jr.

[57] ABSTRACT

An electronic business terminal has the capability of electronically displaying a plurality of individual journal entry items on a CRT at the command of the terminal operator, who can cause the display of items to be scrolled backward or forward as desired, to locate a particular journal item. The information to be displayed is stored in a journal window stack. Controls are provided for determining the address of the initial entry of the stack, the size of the stack and the location at which the next item is to be added to the stack. Controls are also provided for display of the entries contained in the stack. A counter is provided to count the number of entries in the stack.

8 Claims, 3 Drawing Sheets

ELECTRONIC JOURNAL WINDOW DISPLAY

BACKGROUND OF THE INVENTION

Occasions may arise when the operator of a retail point of sale terminal has need to review the information which has been printed on the journal tape of the retail terminal. This need is frequently associated with the processing of VOID operations related to a customer transaction. Point of sale terminals typically provide a viewing window which enables the operator to read information which has previously been printed on the journal tape. Such a window may provide a viewing area of approximately fifteen lines of printed data, assuming that there are no blank lines. The terminal may include a mechanical device such as a thumbwheel or a motor operated by manual control buttons to enable the operator to move the tape so that the desired data will appear, if it is not initially visible.

It would be desirable to increase the number of lines of data which can be viewed at one time, to place such data on a display, such as a CRT, and to minimize the need for the operator to use a mechanical device such as a thumbwheel to change the position of the journal record in order to view a selected portion of such record.

SUMMARY OF THE INVENTION

The present invention relates to an apparatus and method for enabling a record of journal entries made by a terminal to be viewed on an electronic display forming a part of the terminal.

In accordance with one embodiment of the present invention, an electronic business terminal comprises data entry means including data input means for entering data pertaining to business transactions and transaction input means for controlling said transactions; transaction means controlled by operation of said data input means and by operation of said transaction input means to provide individual transaction data items; buffer means coupled to said transaction means for storing said individual transaction data items; printing means coupled to said buffer means for printing said transaction data items; display stack storage means containing a plurality of locations therein, each location having an address, commencing with an initial address, coupled to said buffer means for receiving items of individual transaction data from said buffer means in said locations; display means coupled to said display stack means for displaying said individual transaction data items; and control means controlled by an operator of said business terminal for causing said display means to display a selected plurality of consecutive individual transaction data items which are stored in locations at addresses in said display stack storage means, said control means including stack start means for determining the initial address in the display stack storage means, stack size means for determining how many lines of individual transaction data can be stored in the display stack storage means, stack address pointer means for determining the address of a location in the display stack storage means in which an individual transaction display item will be stored, display stack pointer means for selecting the address of the first one of said consecutive individual transaction display items to be displayed, and means for causing the individual transaction display items at the selected address and following addresses to be transferred from the display stack storage means to the display means.

In accordance with a second embodiment of the present invention, a process for displaying journal information in an electronic window display of a business terminal having data processing means and data control input means, said display having a capacity of a given number of lines, comprises the following steps: (a) during operation of the business terminal, storing by said terminal of journal information to be displayed in a journal window stack in which a number of entries may be placed; (b) initiating a request by an operator of the terminal to display journal information after said journal information has been stored in said journal window stack; (c) maintaining in storage by said data processing means any information which is being displayed on said display at the time that the journal information display request is initiated by an operator, for subsequent re-display after the journal information display request has been completed; (d) initializing of a display pointer by said data processing means to determine the first location in the journal window stack of the journal information which is to be displayed on the display; (e) displaying by said terminal the journal information on the display; (f) checking by the data processing means of the data and control input means for control entries which would cause alteration of the display after the display of journal information has commenced; (g) scrolling the journal information on the display as a consequence of said checking of step (f) in the event of operation by an operator of the terminal of a control entry on the data and control input means which directs such action; and (h) restoring to the display the information which was previously maintained in storage, as a consequence of said checking of step (f) in the event of operation by an operator of the terminal of a control entry on the data and control input means which directs such action.

It is accordingly an object of the present invention to provide an electronic journal window display.

Another object is to provide an electronic journal window display which can be scrolled to display journal items not initially visible on the display.

Another object is to provide an electronic business terminal having an electronic journal window display.

Another object is to provide a process for displaying journal information on an electronic journal window display of a business terminal.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

In a point of sale terminal, the software typically buffers the journal printer information prior to initiating an actual print operation. In the present invention, the buffered information is saved in a random access memory stack prior to initiating a journal print operation. The size of the stack may be specified as a parameter by the terminal user during a system generation process, as will be subsequently described. The terminal software maintains a stack pointer to be used for placing entries into the stack, and this pointer is reset to the starting memory location of the stack whenever the last stack memory location has been filled. The latest journal printer data is thus recorded in the terminal memory as well as on the journal tape by the printer.

Information stored in the memory stack may be displayed on a display, such as a CRT, included as a part of the point of sale terminal. The stack normally will contain a larger number of information entries than can be displayed at one time on the display, and means are therefore provided to display selected portions of the total number of entries stored in the stack, and to scroll the entries in either of two directions in order to cause particular desired items to be displayed.

Figure 1:
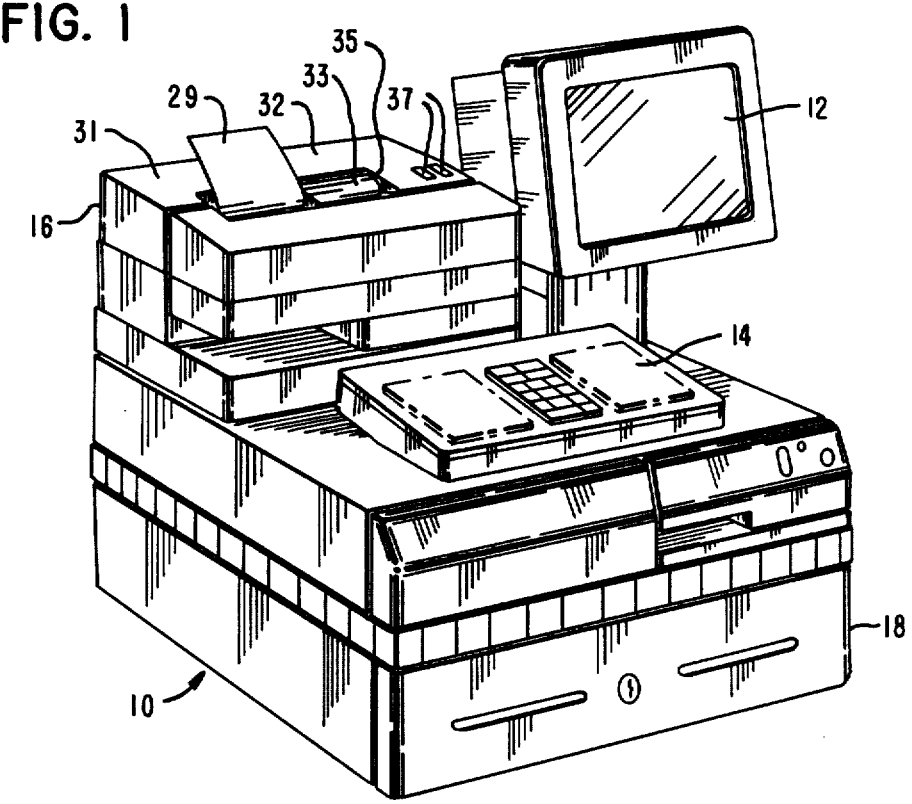
FIG. 1 is a perspective view of a business terminal capable of performing point of sale transactions, which may incorporate the electronic journal window display of the present invention.

Referring now to FIG. 1, there is shown a typical business terminal 10, such as a terminal for use in retail establishments. In its illustrated embodiment, the terminal 10 includes a display screen 12, a keyboard 14, a printer 16, and a cash drawer 18. The printer 16 includes a receipt printer 31 for providing a customer receipt 29 and a journal printer 32 for providing a journal record 33, which is visible through an aperture 35. The journal record 33 may be shifted for viewing additional entries by operation of keys 37. One such commercially available terminal is the NCR 7052, manufactured by NCR Corporation, Dayton, Ohio.

Figure 2:
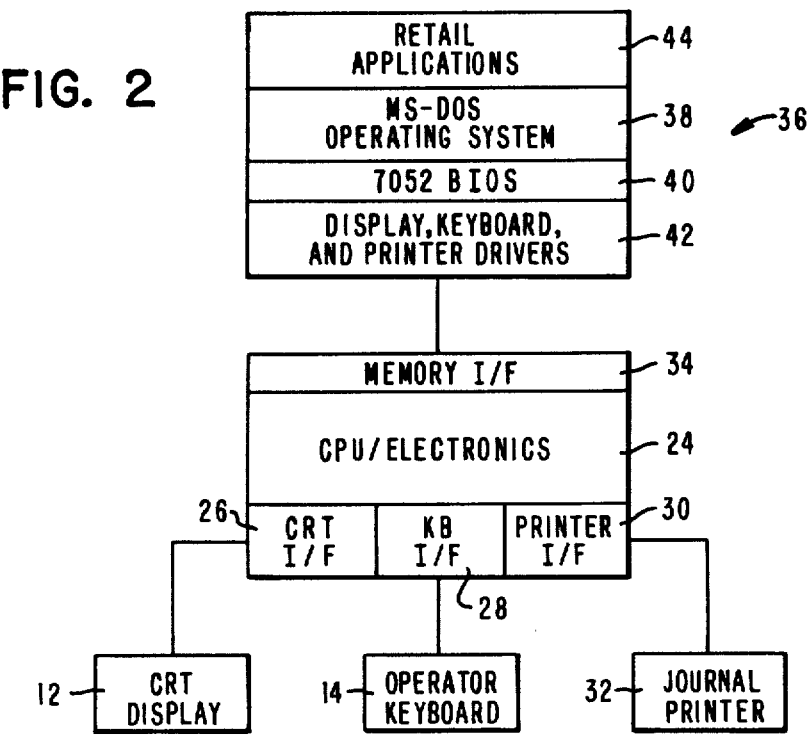
FIG. 2 is a block diagram showing the functional organization of the terminal of FIG. 1.

A schematic representation of the hardware and software elements of the terminal 10 is shown in FIG. 2. A central processing unit 24, which includes a suitable microprocessor, such as an Intel 80286, manufactured by Intel Corporation, Santa Clara, Calif., is coupled by a display interface 26 to the display screen 12, is coupled by a keyboard interface 28 to the keyboard 14, and is coupled by a printer interface 30 to the journal printer 32 which is included in the printer 16. The central processing unit 24 is also coupled by a memory interface 34 to a memory 36, which among other items, customarily stores an operating system 38 which may be an MS-DOS operating system. The memory 36 also stores input-output software 40 such as BIOS; software drivers 42 for the display, keyboard and printer; and additional software 44, generally designated as retail applications. The retail applications area 44 may typically contain the application software, memory for dynamic storage allocation (DSA) usage, including a journal printer buffer 51, fixed storage areas for financial totals, and any other items required by the system.

Figure 3:
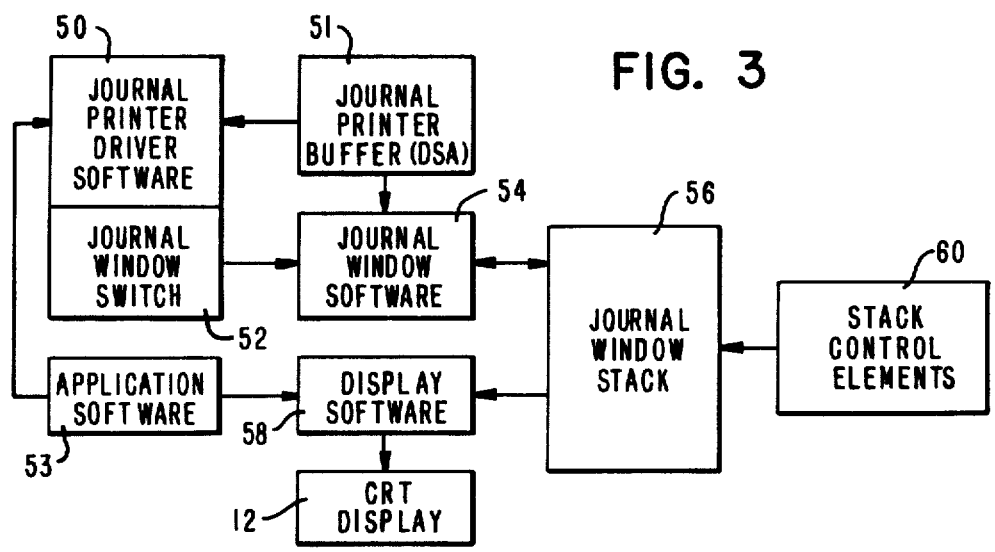
FIG. 3 is a block diagram showing the relationship of various software modules which interact to provide the electronic journal window display of the present invention.

Shown in FIG. 3 is a block diagram which illustrates the relationship of various software modules which interact to provide the electronic journal window of the present invention. All of these modules are included in the display, keyboard and printer driver software represented in block 42 of the memory 36 of FIG. 2.

Shown at the left of FIG. 3 is the journal printer driver software, generally designated by the reference character 50, which is typical software employed for driving a printer normally found in a point of sale terminal. The application software 53 provides specific functionality to control the man-machine interactions necessary to support a user application such as retail point of sale transactions. The printer driver software 50 is activated by a calling sequence from the application software 53. When it is desired to include the journal window display feature of the present invention in such a terminal, a software "switch", designated 52, is incorporated into the software 50. This is incorporated in such a manner that at a given point in the routine followed by the journal printer driver software 50, the "switch" 52 is operated, which enables the accumulation of journal printer data from the buffer 51 into the journal window stack 56. The accumulation of this data is accomplished by the journal window software 54. The decision as to whether or not to include the electronic journal window display feature is made by the purchaser of the terminal at the time that the terminal software is configured in such a manner as to meet the particular needs of the purchaser, using a "system generation" or "sysgen" system. If the purchaser does not wish to incorporate the electronic journal window display feature, then the "switch" 52 is not activated, and the journal printer driver software will simply pass through that location to the next active instruction, and the system will not include the electronic journal window display which is the subject of this invention.

Figure 4:
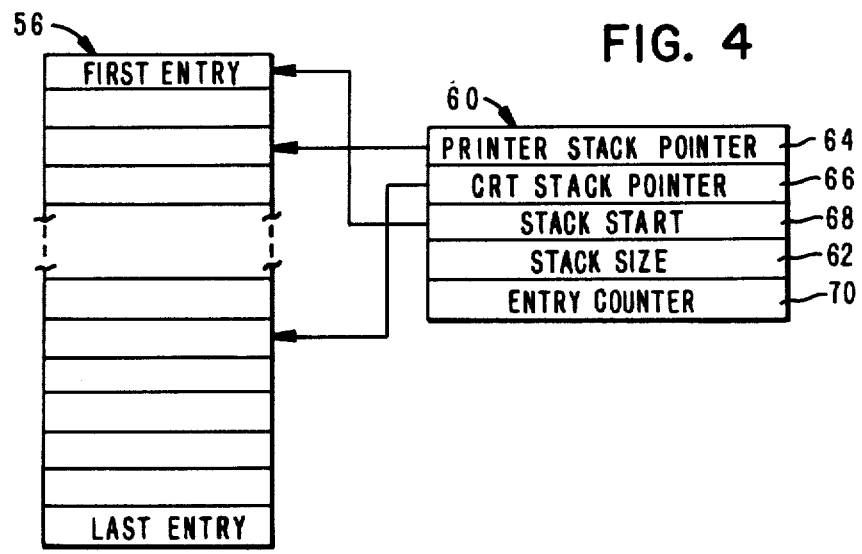
FIG. 4 is a block diagram showing in greater detail the journal window stack and stack control elements.

If the customer has selected the electronic journal window display feature, when the switch 52 is operated, control of the terminal passes to the journal window software 54. The journal window software 54 operates in conjunction with the journal printer driver software 50 to obtain information from the journal printer buffer 51 in the DSA section of the system memory. The journal printer buffer 51 contains the most recent printer journal entry. The journal window software 54 causes journal data resulting from operation of the machine to be written into the journal window stack, or data array, 56. The display software 58, in turn, is activated by the application software 53, receives selected data from the stack 56 and acts through the memory interface 34, the CPU/electronics 24 and the CRT interface 26 to display the selected data on the CRT display 12. Stack control elements 60 contain information used by the journal window software 54 to determine where to place the next journal entry into the journal window stack 56, and also contain information used by the display software 58 to determine what information is to be displayed on the display 12. The journal window stack 56 and the stack control elements 60 are shown in greater detail in FIG. 4.

The previously-mentioned system generation process is also utilized to determine how many lines of journal data are to be stored in the journal window stack 56. The data array is comprised of a number of lines which may extend from line no. 1 of the stack 56 to line no. N. Each of these lines may typically contain forty bytes of data, with each byte being an eight-bit character. The desired number of lines, as determined in the system generation process, is stored in the stack size location 62 of the stack control elements 60. Limiting values may be established for the stack size and may, for example, include a minimum value of 50 journal lines and a maximum value of 200 journal lines. If the operator or user of the system generator includes the electronic journal window display feature, but does not respond to a question as to the size of the stack, a default value, such as the 50-line minimum value, will be used for the size of the stack.

Other elements of the stack control elements 60 include a printer stack pointer 64. This printer stack pointer is used by the journal window software 54 to determine the next available stack storage location. The printer stack pointer 64 is initially set to an address equal to the starting memory address of the stack 56. The value of the printer stack pointer 64 is advanced or increased incrementally each time a line of print is sent to the journal printer. When the address of the printer stack pointer 64 is incremented to the last entry address of the stack 56, the pointer is reset back to the starting address of the stack 56. The journal window stack 56 is thus a circular buffer.

Also included is a CRT stack pointer 66. This pointer is used by the display software 58 to control which items of information are taken from the stack 56 and displayed on the CRT display 12. The CRT stack pointer contains an address that points to a location in the journal window stack. When the operator of the terminal activates a display operation in order to view journal information on the display 12, the CRT stack pointer 66 is initialized to the address of the printer stack pointer 64 less a value equal to the total permitted number of journal entries viewable at one time on the display 12, or less the entry counter 70 value, if that is less than the total permitted number of entries. A typical total number of entries viewable at one time on the display is twenty-four. If the number of journal entries is twenty-four, or exceeds twenty-four, then the address of the CRT stack pointer is based upon the printer stack pointer value minus twenty-four, or a multiple of twenty-four, if appropriate. When up to twenty-four lines of journal information have been displayed on the screen 12, the address of the CRT stack pointer 66 may be incremented or decremented by operation of the "scroll forward" or "scroll backward" terminal keys to allow information to be scrolled forward or backward on the screen.

The stack start location 68 is a cell in the system memory, and is a fixed element of information which is not altered during operation of the system. It points to the location in memory where the stack 56 actually begins.

As described above, the stack size 62 is a fixed parameter provided by the user at system generation time which determines how many lines of journal information can be stored in the stack 56.

The entry counter 70 indicates the number of locations which have actually been used at any given time in the stack 56. This count is important when the stack 56 is first used, at the beginning of a day, for example, and is not completely full. This count is used to limit access to stack information to avoid the display of unknown or spurious stack locations if the stack has not been completely filled.

Figure 6:
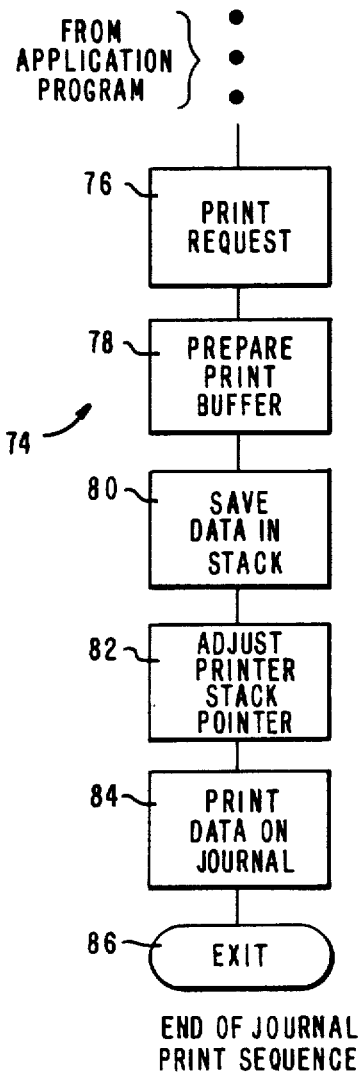
FIG. 6 is a flow diagram showing the journal print sequence.

Shown in FIG. 6 is a sub-routine 74 of the journal printer driver software 50 which is employed for controlling operation of the terminal journal printer 32. It will be seen from FIG. 6 that this sub-routine 74 is entered at an appropriate time from whatever application program is being used to control the terminal in a desired sequence of operation. After a journal print request has been received from the application software 53 via an appropriate operator-activated keyboard entry on the terminal 10, as represented by block 76, the print buffer is prepared, as represented in block 78, by loading with appropriate journal entry data. The journal entry data is then also entered into the journal window stack 56, as represented by block 80. The journal window software 54 then adjusts the printer stack pointer 64 to the next available location in the journal window stack 56, as represented by block 82. The data is then printed on the journal sheet by the printer 32, as represented by the block 84, and the sub-routine 74 is exited, as represented by the block 86. This is the end of the journal print sequence. As a consequence of the preceding sub-routine, the journal information necessary for use in the electronic journal window display has been saved for display at the command of the operator.

Figure 5:
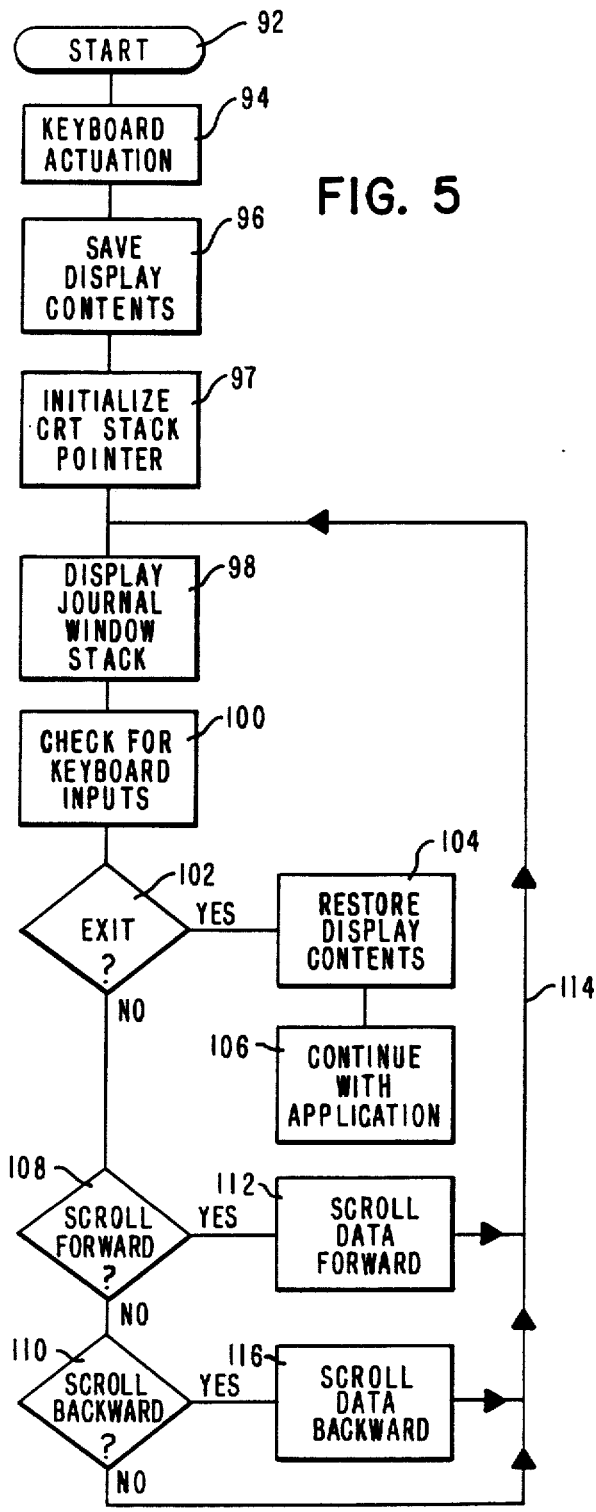
FIG. 5 is a flow diagram showing the process for displaying and scrolling the electronic journal window display.

When an operator desires to initiate such a display, the sub-routine 90 of FIG. 5 is employed. Conditioning for operation of this sub-routine, as represented by the start block 92, is caused by some appropriate action or event occurring in the retail application software 44. Actual initiation of the sub-routine is accomplished by operation of an appropriate terminal key or key sequence by the operator, as represented by block 94. This causes the current contents of the display to be saved, as represented by block 96, so that this display can be returned to the CRT 12 after the interruption occasioned by display of the journal data. The initial value for the CRT stack pointer 66 is then determined by the display software 58, as represented in block 97. In so doing, the value of the entry counter 70 is examined. If the value is zero, the CRT stack pointer 66 is set to zero to signify that no journal data has been accumulated in the journal window stack 56. If the entry counter 70 is non-zero, the display software 58 will compute the initial value of the CRT stack pointer 66 in accordance with the following algorithm:

| Variable definitions: | |
| --- | --- |
| PRINTER STACK POINTER VALUE = | PSP |
| CRT STACK POINTER VALUE = | CSP |
| STACK START = | SS |
| STACK SIZE = | SIZE |
| ENTRY COUNTER = | EC |

ASSUMPTIONS: (1) STACK SIZE $\geq$ 48; (2) 24 lines of data to be displayed; (3) PSP values are ascending.
CASE 1: LESS THAN 24 LINES OF INFORMATION WILL BE DISPLAYED.
IF EC $\leq$ 24 THEN CSP = PSP − EC
CASE 2: 24 OR LESS LINES OF INFORMATION WILL BE DISPLAYED.
IF EC > 24 AND EC < SIZE THEN CSP = PSP − 24
CASE 3: 24 LINES OF INFORMATION WILL ALWAYS BE DISPLAYED.
IF EC = SIZE THEN IF (PSP − 24) < SS THEN CSP = SIZE + PSP − 24 ELSE CSP = PSP − 24

The contents of the journal stack, starting at the address which is computed by the above algorithm and contained in the CRT stack pointer 66, are then displayed on the display 12, as represented by block 98. The number of lines of data appearing on the display 12 is controlled by the value of the entry counter 70, as shown in the above algorithm.

The keyboard input of the terminal is checked, as in block 100, to see whether or not a command to scroll the display forward or backward, or an exit command, has been received.

A decision is then made in block 102 as to whether or not an exit key has been activated. If so, the display contents saved in block 96 are restored (block 104) and control of the terminal is returned to the application program being used (block 106). If no exit key has been activated, a determination is made as to whether a scroll forward key (block 108) or a scroll backward key (block 110) has been activated. If the scroll forward key is activated, the data is scrolled forward to the desired extent (block 112), after which the process is returned over path 114 to block 98. If the scroll forward key is not activated, but the scroll backward key is activated, the data is scrolled backward to the desired extent (block 116), after which the process is returned over path 114 to block 98.

From block 98, the process continues as before, and if neither the exit key nor the scrolling keys is activated, the process continues to loop until one of the above keys is activated.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. An electronic business terminal comprising:
   data entry means including data input means for entering data pertaining to business transactions and transaction input means for controlling said transactions;
   transaction means controlled by operation of said data input means and by operation of said transaction means to provide individual transaction data items;
   buffer means coupled to said transaction means for storing said individual transaction data items;
   printing means coupled to said buffer means for printing said transaction data items;
   display stack means containing a plurality of location therein, each location having an address, commencing with an initial address, coupled to said buffer means for receiving and storing items of individual transaction data from said buffer means in said locations;
   display means coupled to said display stack means for displaying said individual transaction data items; and
   control means controlled by an operator of said business terminal for causing said display means to display a selected plurality of consecutive individual transaction data items which are stored in locations at addresses in said display stack storage means, said control means including stack start means for determining the initial address in the display stack storage means, stack size means for determining how many lines of individual transaction data can be stored in the display stack storage means, stack address pointer means for determining the address of a location in the display stack storage means in which an individual display item will be stored, display stack pointer means for selecting the address of the first one of said consecutive individual transaction display items to be displayed, and means for causing the individual transaction display items at the selected address and following addresses to be transferred from the display stack storage means to the display means.

2. The electronic business terminal of claim 1, in which said control means includes means for scrolling said display of a plurality of consecutive transaction data items to selectively provide different sequences of such items.

3. The electronic business terminal of claim 2 in which said scrolling means is bi-directional.

4. A process for displaying journal information in an electronic window display of a business terminal having data processing means and data and control input means, said data display having a capacity of a given number of lines, comprising the following steps:
   (a) during operation of the business terminal, storing by said terminal of journal information to be displayed in a journal window stack in which a number of entries may be placed;
   (b) initiating a request by an operator of the terminal to display journal information after said journal information has been stored in said journal window stack;
   (c) maintaining in storage by said data processing means any information which is being displayed on said display at the time that the journal information display request is initiated by an operator, for subsequent re-display after the journal information display request has been completed;
   (d) initializing of a display pointer by said data processing means to determine the first location in the journal window stack of the journal information which is to be displayed on the display;
   (e) displaying by said terminal the journal information on the display;
   (f) checking by the data processing means of the data and control input means for control entries which would cause alteration of the display after the display of journal information has commenced;
   (g) scrolling the journal information on the display as a consequence of said checking of step (f) in the event of operation by an operator of the terminal of a control entry on the data and control input means which directs such action; and
   (h) restoring to the display the information which was previously maintained in storage, as a consequence of said checking of step (f) in the event of operation by an operator of the terminal of a control entry on the data and control input means which directs such action.

5. The process of claim 4 in which the step of initializing the display pointer includes determining an initial value of the display pointer by subtracting either the number of entries in the journal window stack or the line capacity of the display, whichever is greater, from a value representing the most recent location of the journal window stack in which an information entry was made.

6. The process of claim 5 in which the line capacity of the display is 24 lines.

7. The process of claim 5 in which a record of the last location of the journal window stack in which an information entry has been made is maintained in a stack pointer.

8. The process of claim 5 in which the number of entries in the journal window stack is maintained in an entry counter.

* * * * *

UNITED STATES PATENT AND TRADEMARK OFFICE
CERTIFICATE OF CORRECTION

PATENT NO. : 4,852,042

DATED : July 25, 1989

INVENTOR(S) : Art D. Zur Muhlen et al.

It is certified that error appears in the above-identified patent and that said Letters Patent is hereby corrected as shown below:

Column 7, line 38, before the word "means" insert --input--.

Column 7, line 44, after the word "stack" insert --storage--.

Column 7, line 44, delete "location" and substitute --locations--.

Column 7, line 65, after the word "individual" insert --transaction--.

Column 8, line 15, delete the word "data".

Signed and Sealed this

Twenty-second Day of May, 1990

Attest:

HARRY F. MANBECK, JR.

*Attesting Officer*     *Commissioner of Patents and Trademarks*